(12) United States Patent
Rydén et al.

(10) Patent No.: US 10,631,213 B2
(45) Date of Patent: Apr. 21, 2020

(54) CELL CHANGE IN A WIRELESS COMMUNICATION SYSTEM

(71) Applicant: Telefonaktiebolaget LM Ericsson (publ), Stockholm (SE)

(72) Inventors: Henrik Rydén, Linköping (SE); Joel Berglund, Linköping (SE); Pradeepa Ramachandra, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 231 days.

(21) Appl. No.: 15/540,080

(22) PCT Filed: May 4, 2017

(86) PCT No.: PCT/SE2017/050435
§ 371 (c)(1),
(2) Date: Jun. 27, 2017

(87) PCT Pub. No.: WO2018/203779
PCT Pub. Date: Nov. 8, 2018

(65) Prior Publication Data
US 2018/0324661 A1 Nov. 8, 2018

(51) Int. Cl.
*H04W 36/08* (2009.01)
*H04W 48/20* (2009.01)
*H04W 36/30* (2009.01)
*H04W 88/08* (2009.01)
*H04B 7/06* (2006.01)

(52) U.S. Cl.
CPC .......... *H04W 36/08* (2013.01); *H04B 7/0695* (2013.01); *H04W 48/20* (2013.01); *H04W 36/30* (2013.01); *H04W 88/085* (2013.01)

(58) Field of Classification Search
CPC .... H04W 36/08; H04W 36/30; H04W 88/085
See application file for complete search history.

(56) References Cited

U.S. PATENT DOCUMENTS

| 8,502,743 B2 * | 8/2013 | Ownbey | H01Q 1/246 343/758 |
| 2005/0176385 A1 * | 8/2005 | Stern-Berkowitz | H04W 36/18 455/101 |

(Continued)

OTHER PUBLICATIONS

CMCC, "How to derive a cell quality for RRM measurement", 3GPP TSG-RAN WG2 Meeting #97, Feb. 13-17, 2017, pp. 1-4, Athens, Greece, R2-1701908 (Revision of R2-1700312).

*Primary Examiner* — Edan Orgad
*Assistant Examiner* — Emmanuel K Maglo
(74) *Attorney, Agent, or Firm* — Coats & Bennett, PLLC

(57) ABSTRACT

A wireless device (16) is configured for use in a wireless communication system (10). The wireless device (16) in this regard is configured to obtain, for each of one or more cells, information derived from a measure of dispersion of the values of received signal measurements respectively performed by the wireless device (16) on different transmit beams of the cell. The wireless device (16) is also configured to use the obtained information to select, or to assist network equipment (500A, 500B) to select, from the one or more cells a target cell to which the wireless device (16) is to change. The wireless device (16) is further configured to perform a cell change to the selected target cell.

21 Claims, 6 Drawing Sheets

(56) References Cited

U.S. PATENT DOCUMENTS

| | | | | |
|---|---|---|---|---|
| 2011/0143752 | A1* | 6/2011 | Hong | H04W 48/18 |
| | | | | 455/428 |
| 2012/0052828 | A1* | 3/2012 | Kamel | H04B 7/0408 |
| | | | | 455/226.2 |
| 2016/0262077 | A1* | 9/2016 | Zhang | H04W 24/08 |
| 2017/0006539 | A1* | 1/2017 | Kakishima | H04B 7/0478 |
| 2017/0034730 | A1* | 2/2017 | Zhang | H04W 24/08 |
| 2017/0111886 | A1* | 4/2017 | Kim | H04W 72/042 |
| 2017/0207843 | A1* | 7/2017 | Jung | H04B 7/0408 |
| 2017/0207845 | A1* | 7/2017 | Moon | H04B 7/088 |
| 2017/0208494 | A1* | 7/2017 | Moon | H04W 24/10 |
| 2017/0230910 | A1* | 8/2017 | Kimura | H04B 7/0632 |
| 2017/0244467 | A1* | 8/2017 | Cho | H04B 7/0413 |
| 2017/0346545 | A1* | 11/2017 | Islam | H01Q 1/245 |
| 2017/0366236 | A1* | 12/2017 | Ryoo | H04B 7/0421 |
| 2018/0199328 | A1* | 7/2018 | Sang | H04B 7/0617 |
| 2018/0331747 | A1* | 11/2018 | Kakishima | H04B 7/0639 |

* cited by examiner

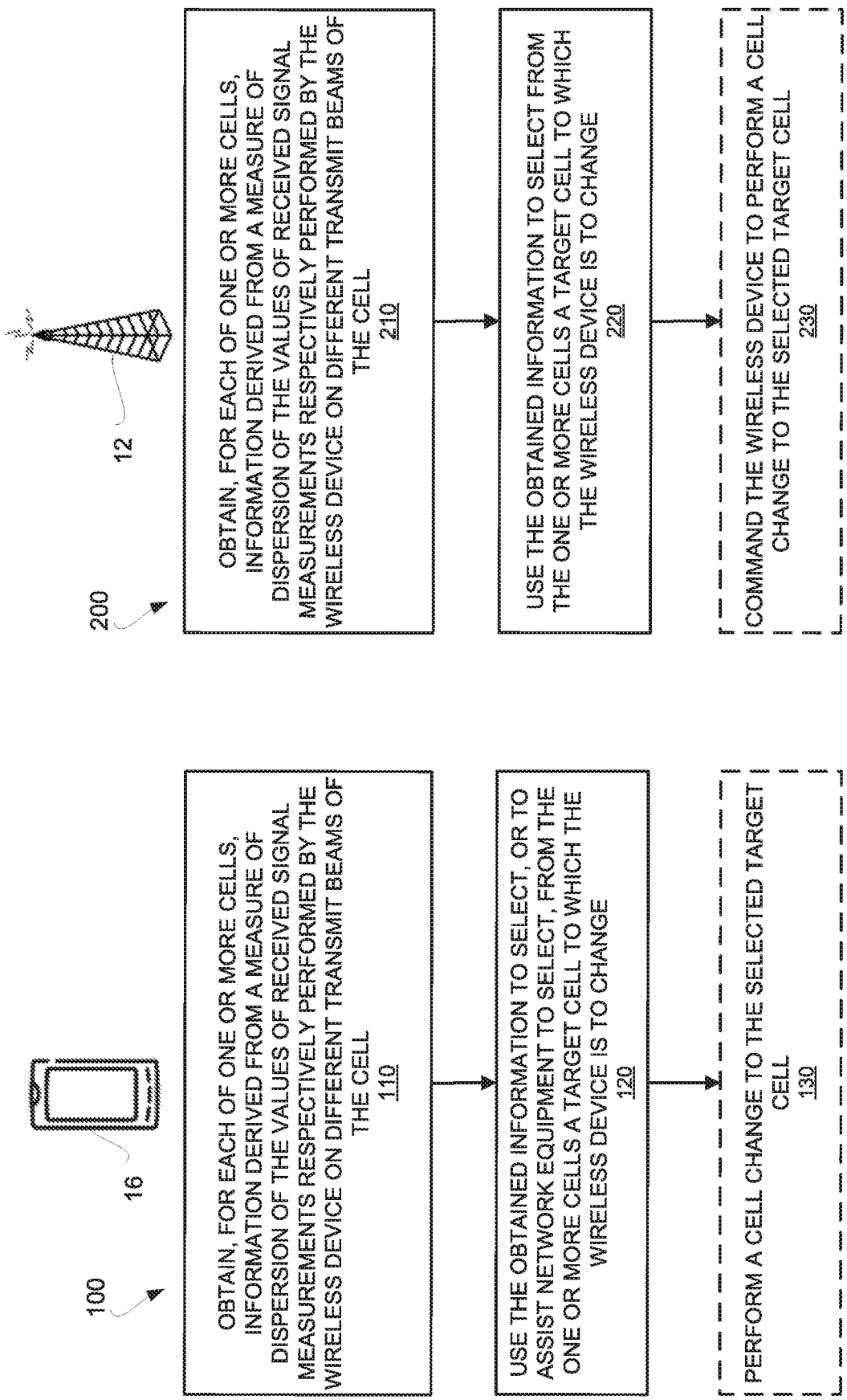

CELL CHANGE IN A WIRELESS COMMUNICATION SYSTEM

TECHNICAL FIELD

The present application generally relates to a wireless communication system, and particularly relates to cell change in such a system.

BACKGROUND

A transmitter employs beamforming in order to amplify transmitted signals in selected directions, while weakening them in others. To beamform, the transmitter transmits a signal from multiple transmit antennas, but with individually adjusted phase shifts or time delays. This effectively creates a transmit beam in the resulting transmit radiation pattern of the signal—e.g., through controlled constructive and destructive interference of the phase-shifted signals from individual antenna elements.

Beamforming by network equipment aims to improve the performance of signals received by a wireless device from its serving cell. But, especially if each cell has multiple transmit beams on which the wireless device may be served, beamforming complicates analysis of which candidate cell the wireless device should target for a cell change when signal quality of the serving cell degrades.

SUMMARY

Some embodiments herein select the target cell of a cell change in a way that accounts for the extent to which received signal measurements on each candidate cell's transmit beams are dispersed. In one embodiment, for example, a candidate cell with less signal measurement dispersion across its transmit beams is favored as a target cell over a candidate cell with more signal measurement dispersion across its transmit beams. This approach may for instance effectively select the candidate cell with transmit beams that will collectively provide the best or sufficient signal performance for the longest period of time, e.g., so that the cell change proves robust over time and thereby reduce the number of cell changes required. This may in turn reduce signaling overhead associated with cell changes as well as the risk of cell change drops.

More particularly, embodiments herein include a method performed by a wireless device configured for use in a wireless communication system. The method includes obtaining, for each of one or more cells, information derived from a measure of dispersion of the values of received signal measurements respectively performed by the wireless device on different transmit beams of the cell. The method also includes using the obtained information to select, or to assist network equipment to select, from the one or more cells a target cell to which the wireless device is to change. The method further includes performing a cell change to the selected target cell.

In some embodiments, using the obtained information comprises reporting the obtained information to the network equipment. In this case, the cell change may be performed responsive to receiving a command from the network equipment to perform the cell change to the selected target cell.

Embodiments herein also include a method performed by network equipment configured for use in a wireless communication system. The method comprises obtaining, for each of one or more cells, information derived from a measure of dispersion of the values of received signal measurements respectively performed by the wireless device on different transmit beams of the cell. The method further comprises using the obtained information to select from the one or more cells a target cell to which the wireless device is to change. The method also comprises commanding the wireless device to perform a cell change to the selected target cell.

Embodiments herein correspondingly include a wireless device configured for use in a wireless communication system. The wireless device is configured to obtain, for each of one or more cells, information derived from a measure of dispersion of the values of received signal measurements respectively performed by the wireless device on different transmit beams of the cell. The wireless device is also configured to use the obtained information to select, or to assist network equipment to select, from the one or more cells a target cell to which the wireless device is to change. The wireless device may further be configured to perform a cell change to the selected target cell.

Yet other embodiments herein include network equipment configured for use in a wireless communication system. The network equipment is configured to obtain, for each of one or more cells, information derived from a measure of dispersion of the values of received signal measurements respectively performed by the wireless device on different transmit beams of the cell. The network equipment is also configured to use the obtained information to select from the one or more cells a target cell to which the wireless device is to change. The network equipment is further configured to command the wireless device to perform a cell change to the selected target cell.

In any of the above embodiments, a relatively smaller dispersion of the values of the received signal measurements for a cell may contribute to favoring that cell for selection over a cell with a relatively larger dispersion of the values of the received signal measurements.

In some embodiments, the measure of dispersion is variance or standard deviation.

In some embodiments, the obtained information is the measure of dispersion. Alternatively, in some embodiments, the obtained information for a cell is a metric that is derived from both (i) the measure of dispersion of the values of received signal measurements respectively performed by the wireless device on different transmit beams of the cell; and (ii) a measure of central tendency of the values of received signal measurements respectively performed by the wireless device on different transmit beams of the cell, where the metric increases with increasing measure of central tendency and decreases with increasing measure of dispersion. In one embodiment, for example, the metric equals either: the measure of central tendency minus the measure of dispersion; or the measure of dispersion divided by the measure of central tendency. Regardless, in some embodiments, the target cell is selected as the cell with the maximum metric. Alternatively or additionally, the metric may be a weighted metric that applies a weight to the measure of dispersion that is different than a weight applied to the measure of central tendency.

In some embodiments, the obtained information is used to select, from among any of the one or more cells whose measure of central tendency of the received signal measurements is above a threshold, the target cell as the cell with the smallest measure of dispersion of the values of the received signal measurements.

In some embodiments, the target cell is selected further using beam configuration information for each of the one or more cells that characterizes an individual or collective configuration of the different transmit beams of the cell. In one embodiment, for example, the beam configuration information for a cell indicates a width or angle of a coverage area collectively spanned by the different transmit beams of the cell in one or more spatial dimensions. Alternatively or additionally, the beam configuration information for a cell may indicate a number of the different transmit beams of the cell or a number of the different transmit beams of the cell whose values of the received signal measurements exceeds a threshold.

Embodiments herein also include corresponding computer programs, carriers, and computer program products.

BRIEF DESCRIPTION OF THE DRAWINGS

FIG. 2 is a logic flow diagram of a method performed by a wireless device according to some embodiments.

FIG. 3 is a logic flow diagram of a method performed by network equipment according to some embodiments.

DETAILED DESCRIPTION

Figure 1:
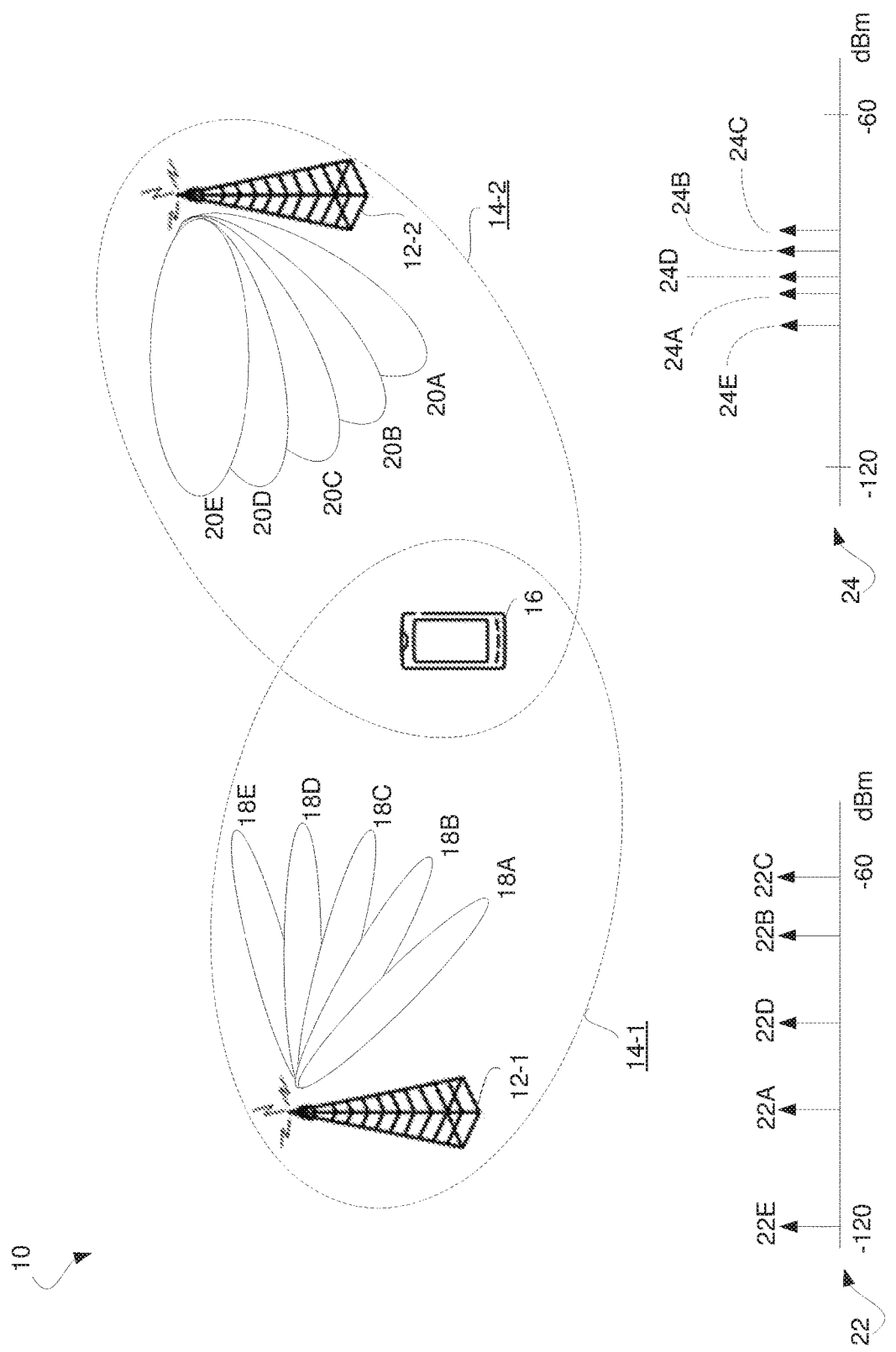
FIG. 1 is a block diagram of a wireless communication system that includes a wireless device and network equipment according to some embodiments.

FIG. 1 shows a wireless communication system 10 according to some embodiments. The system 10 includes network equipment shown in the form of base stations 12-1 and 12-2. Each base station 12-1, 12-2 provides a respective cell 14-1, 14-2. Each base station 12-1, 12-2 in this regard performs transmit beamforming in order to produce multiple transmit beams via which a cell 14-1, 14-2 may serve a wireless device 16. As shown, for example, cell 14-1 has multiple transmit beams 18A-18E and cell 14-2 has multiple transmit beams 20A-20E via which the wireless device 16 may be served.

As channel conditions or other circumstances change, the wireless device 16 may perform a so-called cell change in order to change the cell that serves the wireless device 16 from a "source" cell to a larger cell. The cell change may for instance constitute a handover, e.g., when the wireless device 16 is in a connected or active state with a connection to the network, or constitute cell (re)selection, e.g., when the wireless device 16 is in an idle or inactive state without such a connection. In any event, to support the decision of which cell to select as the target cell, the wireless device 16 performs received signal measurements on the transmit beams of each cell 14-1, 14-2 considered as a candidate for selection. The values of the received signal measurements may indicate the strength and/or quality with which the wireless device 16 received reference signals transmitted on respective transmit beams of each candidate cell 14-1, 14-2. In some embodiments, for example, the values of the received signal measurements indicate a beam-level reference signal received power, i.e., beam-level RSRP or BRSRP, associated with transmit beams that are dedicated as mobility beams for mobility management. More generally, though, the received signal measurements that the wireless device 16 performs on the transmit beams of a cell may be referred to herein as being the transmit beam received signal measurements for that cell.

FIG. 1 shows a distribution 22 of the values 22A-22E of received signal measurements respectively performed by the wireless device 16 on the transmit beams 18A-18E of cell 14-1. FIG. 1 also shows a distribution 24 of the values 24A-24E of received signal measurements respectively performed by the wireless device 16 on the transmit beams 20A-20E of cell 14-2.

As depicted in this example, the value 22C of the received signal measurement on transmit beam 18C of cell 14-1 is the highest among all of the measurement values 22A-22E and 24A-24E. Selecting the target cell solely on this basis would suggest that cell 14-1 should be selected as the target cell. However, the value 22E of the received signal measurement on transmit beam 18E of cell 14-1 is the lowest among all of the measurement values 22A-22E and 24A-24E. Should conditions on transmit beam 18C change, the measurement value 22E suggests that transmit beam 18E would not likely offer as good of a fallback beam in cell 14-1 as any of the beams in cell 14-2, meaning that an additional cell change may need to be performed in such a case. By contrast, the value 24C of the received signal measurement on transmit beam 20C of cell 14-2 is the third-highest among all of the measurement values, and the lowest measurement value 24E for cell 14-2 is still higher than the two lowest measurement values 22A, 22E for cell 14-1. Indeed, the values 24A-24E of the received signal measurements for cell 14-2 are dispersed to a lesser extent than the values 22A-22E of the received signal measurements for cell 14-1, even in cases where the mean of the values 24A-24E of the received signal measurements for cell 14-2 is the same as the mean of the values 22A-22E for cell 14-1. This may be attributable at least in part to cell 14-1's transmit beams 18A-18E each having an individual coverage area that is narrower than the individual coverage area of cell 14-2's transmit beams 20A-20E. In any event, the lesser signal measurement dispersion associated with cell 14-2 suggests that cell 14-2 may offer signal performance that is more robust across its multiple transmit beams 20A-20E than cell 14-1.

In a general sense, then, some embodiments herein select the target cell in a way that accounts for the extent to which received signal measurements on each candidate cell's transmit beams are dispersed. FIG. 2 illustrates a method 100 performed by the wireless device 16 according to one or more embodiments in this regard.

As shown in FIG. 2, the method 100 includes obtaining, for each of one or more cells, information derived from a measure of dispersion of the values of received signal measurements respectively performed by the wireless device 16 on different transmit beams of the cell. Block 100. The measure of dispersion may be for instance a population or sample variance, a population or sample standard deviation, range, mean absolute difference, coefficient of variation, or any measure that indicates the extent to which the values of the received signal measurements are dispersed, i.e., spread out from one another. The measure of dispersion may therefore in some embodiments be a nonnegative real number that is zero if all of the transmit beam received signal measurements for a cell are the same and that increases as the measurements become more diverse from one another. With respect to the example in FIG. 1, for instance, a measure of dispersion of the values 22A-22E of transmit beam received signal measurements for cell 14-1 will be larger than the measure of dispersion of the values 24A-24E of transmit beam received signal measurements for cell 14-2, because the values 22A-22E are more dispersed than the values 24A-24E.

In some embodiments, the obtained information is derived from such a measure of dispersion in the sense that it is a function of the measure of dispersion. The function may or may not be an equality function, i.e., information=f (x)=x. In these and other embodiments, therefore, the information obtained may be the measure of dispersion itself, or may be a metric calculated as a function of or otherwise derived from the measure of dispersion and optionally one or more additional parameters.

No matter the particular form of the information, the method 100 further includes using the obtained information to select, or to assist network equipment to select, from one or more cells a target cell to which the wireless device 16 is to change. Block 120. In embodiments where the wireless device 16 uses the obtained information to assist network equipment's selection of the target cell, e.g., as may be the case for network-controlled handover during connected state, such assistance may simply entail the wireless device 16 reporting the obtained information to the network equipment, e.g., reporting the variance or standard deviation of the received signal measurements for each cell. The network equipment in this case may then select the target cell using the reported information, and transmit a command to the wireless device 16 to perform a cell change to the selected target cell. In embodiments where the wireless device 16 itself selects the target cell, e.g., as may be the case for device-controlled cell (re)selection during idle state, the wireless device 16 may autonomously evaluate the information in order to decide which of the one or more cells considered as candidates to select as the target cell. Whether target cell selection is performed by the network equipment or by the device 16 itself, the method 100 may further include performing a cell change to the selected target cell. Block 130.

FIG. 3 correspondingly illustrates a method 200 performed by network equipment, such as a base station 12. The method 200 similarly includes obtaining, for each of one or more cells, information derived from a measure of dispersion of the values of received signal measurements respectively performed by the wireless device 16 on different transmit beams of the cell. Block 210. The network equipment 200 may for instance receive the information within a report from the wireless device 16, may itself derive the information from a measure of dispersion reported by the wireless device 16 for each cell, e.g., when the information is a metric computed as a function of the measure of dispersion, or may itself derive the information and/or the measure of dispersion from the values of the received signal measurements reported by the wireless device 16 for each cell. Regardless of how the network equipment obtains the information, the method 200 also includes using the obtained information to select from the one or more cells a target cell to which the wireless device 16 is to change. Block 220, and commanding the wireless device 16 to perform a cell change to the selected target cell. Block 230. The network equipment may for instance transmit a cell change command, such as a handover command, that identifies the target cell to which the wireless device 16 is to change. The command in some embodiments also identifies a transmit beam via which the wireless device 16 is to access or connect to the identified target cell.

No matter whether target cell selection is performed by the wireless device 16 or network equipment, the selection according to some embodiments proves robust through use of the information described above. By using the information, for instance, the wireless device 16 or network equipment may select the candidate cell with transmit beams that will collectively provide the best or sufficient signal performance for the longest period of time, e.g., so that the cell change proves robust over time and thereby reduce the number of cell changes required. This may in turn reduce signaling overhead associated with cell changes as well as the risk of cell change drops.

More particularly, in some embodiments, a relatively smaller dispersion of the values of the transmit beam received signal measurements for a cell contributes to favoring that cell for selection over a cell with a relatively larger dispersion of the values of the transmit beam received signal measurements, e.g., as indicated by the obtained information. In terms of the measure of dispersion, this may mean that a relatively smaller measure of signal measurement dispersion contributes to favoring that cell for selection over a cell with a relatively larger measure of signal measurement dispersion. Such may merely contribute to favoring one cell over another in the sense that other factors or considerations may also be used for target cell selection, e.g., a measure of central tendency of the transmit beam received signal measurements, a number of transmit beams in a cell, a number of transmit beams with received signal measurements above a threshold, etc. These other factors or considerations may be represented or otherwise accounted for in the information obtained in FIGS. 2-3, e.g., in addition to the measure of dispersion, or may be considered separately from the information obtained in the target cell selection decision.

In some embodiments, for example, the obtained information is used to select, from among any of the one or more cells whose measure of central tendency of the received signal measurements is above a threshold, the target cell as the cell with the smallest measure of dispersion of the values of the received signal measurements, e.g., the cell whose received signal measurements have the smallest variance or standard deviation among those cells whose received signal measurements have a mean above a threshold. In one implementation of this embodiment where the obtained information for a cell is the measure of dispersion itself, the wireless device 16 reports information that is the measure of dispersion for each cell's transmit beam received signal measurements and also reports the measure of central tendency for each cell's transmit beam received signal measurements. The network equipment upon receipt identifies which cells are reported as having the measure of central tendency above the threshold, and then selects from the identified cells the cell that has the smallest reported measure of dispersion.

In other embodiments, by contrast, the obtained information for a cell is a metric that is derived from, e.g., calculated as a function of, both the measure of dispersion and the measure of central tendency for the cell's transmit beam received signal measurements. In one such embodiment, the metric increases with increasing measure of central tendency and decreases with increasing measure of dispersion. For example, the metric in some embodiment equals the measure of central tendency minus the measure of dispersion. In other embodiments, the metric equals the measure of dispersion divided by the measure of central tendency. In these and other embodiments, therefore, where the measure of central tendency is mean and the measure of dispersion is standard deviation, the metric represents cells that have high signal measurement mean across transmit beams but low signal measurement standard deviation across transmit beams with higher metric values and represents cells that have low signal measurement mean across transmit beams and high signal measurement standard deviation across transmit beams with lower metric values. No matter the particular measure of central tendency or dispersion, though, some embodiments herein select the target cell as the cell with the maximum metric, e.g., so as to prefer cells with high central tendency but low dispersion. In one such embodiment, though, a minimum metric threshold imposes a requirement that a target cell have at least a minimum metric in order to be selected. If no cell fulfills this requirement, no cell is selected as the target cell and no cell change is performed. Note that while described with respect to a metric that increases with increasing measure of central tendency and decreases with increasing measure of dispersion, the converse may be true of the metric in other embodiments, such that the target cell may be selected as the cell with the minimum metric.

Specifically, in one embodiment, the wireless device 16 calculates the population mean and standard deviation of the values of the received signal measurements performed on different transmit beams of each candidate cell i, where i= 0, . . . N. The wireless device 16 in this regard calculates the population mean $\mu_i$ for each cell i as $$\mu_i = \sum_{n_i \in N_i} \frac{BRSRP_{n_i}}{|N_i|},$$

where $N_i$ is the set of transmit beams on which received signal measurements are performed and $BRSRP_{n_i}$ is the beam-level reference signal received power for transmit beam $n_i$ in the set $N_i$ of transmit beams for cell i. Note that if the wireless device 16 is configured to measure a transmit beam of which the wireless device 16 cannot detect, the BRSRP for that beam will reflect a noise level at the wireless device 16. In any event, the wireless device 16 also calculates the population standard deviation $\sigma_i$ for each cell i as $$\sigma_i = \sqrt{\sum_{n_i \in N_i} \frac{(BRSRP_{n_i} - \mu_i)^2}{|N_i|}}.$$

The wireless device 16 then computes a metric as a function of both the mean and standard deviation for each cell, and reports the computed metrics. The wireless device 16 may for example report for each cell i the metric $\Omega_i = \mu_i - \sigma_i$ or $$\Omega_i = \frac{\sigma_i}{\mu_i}.$$

Network equipment that receives the reported metric then selects as the target cell the cell that has the maximum reported metric $\Omega_i$. Note, though, in some embodiments that the reported metric $\Omega_i$ may be one of multiple factors in the selection decision, in which case the maximum reported metric $\Omega_i$ may be a factor that contributes to the network equipment favoring or preferring a certain cell but other factors may contribute to favoring or preferring a different cell.

Figure 4:
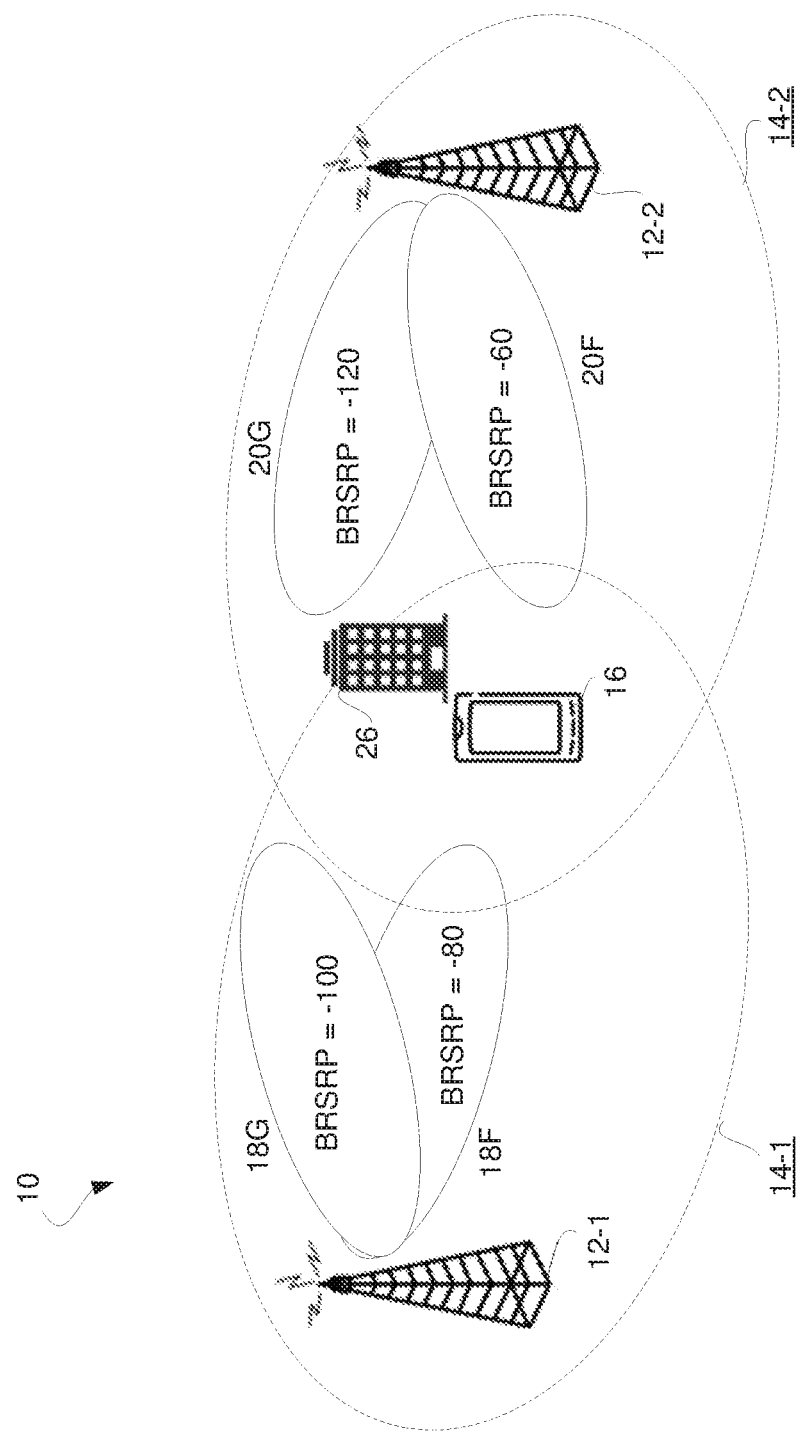
FIG. 4 is a block diagram of a wireless communication system for illustrating an example target cell selection according to some embodiments.

FIG. 4 illustrates a simple example of this. As shown, wireless device 16 performs BRSRP measurements on transmit beams 18F and 18G of cell 14-1 and performs BRSRP measurements on transmit beams 20F and 20G of cell 14-2. The values of the BRSRP measurements on transmit beams 18F and 18G are −80 dBm and −100 dBm respectively, whereas the values of the BRSRP measurements on transmit beams 20F and 20G are −60 dBm and −120 dBm respectively. The BRSRP measurement on transmit beam 20G may be this low for instance due to a building 26 in the direction of that beam 20G. Having taken these measurements, the wireless device 16 computes the metric $\Omega_1 = \mu_1 - \sigma_1 = -90 - 10 = -100$ dBm for cell 14-1 and computes the metric $\Omega_2 = \mu_2 - \sigma_2 = -90 - 30 = -120$ dBm for cell 14-2. The wireless device 16 then reports the metrics $\Omega_1$ and $\Omega_2$ to network equipment that uses the metrics to perform target cell selection. The network equipment in this regard selects as the target cell the cell that has the maximum reported metric $\Omega_i$, which in this example would mean that the network equipment selects cell 14-1 over cell 14-2 because the metric $\Omega_1 = -100$ for cell 14-1 is greater than the metric $\Omega_2 = -120$ for cell 14-2.

In other embodiments, as alluded to above, the wireless device 16 instead reports the mean $\mu_i$ and standard deviation $\sigma_i$ for each cell i, and the network equipment computes the metric $\Omega_i$ for each cell i for use in target cell selection. In still other embodiments, the wireless device 16 just reports the values of the transmit beam received signal measurements for each cell, and the network equipment computes the mean $\mu_i$, standard deviation $\sigma_i$, and metric $\Omega_i$ for each cell i for use in target cell selection.

As these examples demonstrate, the wireless device's report to the network equipment may include for each cell one or more measures of dispersion, one or more measures of central tendency, one or more metrics computed from one or more measures of dispersion and/or one or more measures of central tendency, and/or values of the transmit beam received signal measurements. In one embodiment, for example, the wireless device 16 includes one or more measures of dispersion, one or more measures of central tendency, and/or one or more metrics within a measurement report that reports the values of the transmit beam received signal measurements. Such additional information may be included for instance in a particular information element of the measurement report, e.g., a BRSRP dispersion element or a BRSRP distribution element.

Although the above examples illustrated the metric $\Omega_i$ as being computed in certain ways, the metric $\Omega_i$ may be computed in other ways according to other embodiments. In fact, in some embodiments, the metric $\Omega_i$ constitutes a weighted metric in the sense that it applies particular weights to the measure of dispersion and the measure of central tendency. In one embodiment, these weights are different, e.g., such that the weighted metric $\Omega_i$ is impacted to a greater extent due to one measure and to a lesser extent due to the other measure. These weights may be statically defined or may be dynamically determined according to one or more conditions, e.g., wireless device type, wireless device speed, etc. For example, in some embodiments, target cell selection may be performed using a weighted metric that weights the measure of central tendency greater than the measure of dispersion for a wireless device that is moving at a speed below a defined threshold, that is of a certain type, e.g., a machine-to-machine, M2M, device such as a narrowband Internet of things, NB-IoT, device, or the like. Conversely, target cell selection may be performed using a weighted metric that weights the measure of dispersion greater than the measure of central tendency for a wireless device that is moving at a speed above a defined threshold, that is not of the certain type, e.g., not an M2M or NB-IoT device. The weighting may thereby reflect the relative importance of the measure of dispersion versus the measure of central tendency to long-term or otherwise robust signal performance in a cell with multiple transmit beams.

Note that while the above embodiments were described generally with respect to one or more cells, the particular cell(s) that are considered as candidates for target cell selection and/or that are the object of a report to network equipment may be configured by the network equipment. In some embodiments, for example, the network equipment requests or otherwise configures the wireless device 16 to perform signal measurements on the transmit beams of one or more certain cells. In this case, the wireless device 16 performs the signal measurements on transmit beams of each configured cell and obtains the information described above for each configured cell. The wireless device 16 then either selects the target cell from among the configured cells or reports the information for each configured cell to the network equipment.

Moreover, in some embodiments, the network equipment further requests or otherwise configures the wireless device 16 to perform signal measurements on one or more certain transmit beams of each cell. That is, the network equipment identifies the particular transmit beam(s) on which the wireless device 16 is to perform received signal measurements. In some embodiments, the measure of dispersion discussed above for a cell constitutes a measure of the dispersion of all of the particular transmit beams on which the wireless device 16 performs received signal measurements for that cell. In other embodiments, by contrast, the measure of dispersion for a cell constitutes a measure of dispersion of only some of the particular transmit beams on which the wireless device 16 performs received signal measurements for that cell; namely, those that meet defined criteria. The defined criteria may dictate for instance that the value of the received signal measurement performed on a transmit beam for a cell must be above a defined absolute or relative threshold in order to be represented by the measure of dispersion for the transmit beams of that cell. The measure of dispersion may for example be limited to representing the signal measurement dispersion across transmit beams with signal measurement values above a minimum threshold. Such a limit to the measure of dispersion carries over into a limit to the information derived from the limited measure of dispersion.

Generally, therefore, the network equipment in some embodiments transmits configuration information to the wireless device 16. The configuration information may indicate on which transmit beams to perform received signal measurements, for which cells to perform received signal measurements, and/or which type of received signal measurements to perform. The configuration information may alternatively or additionally indicate what information to report to the network equipment and/or how to derive the information used for target cell selection or selection assistance from the measure of dispersion.

As applied in particular to embodiments that use beam RSRP measurements, these embodiments enable the network to take further detailed RSRP distribution based handover decisions depending on the handover algorithm's optimization policy, e.g., minimize short stay in the cell, minimize handover failure, etc. In order to understand the beam RSRP distribution, either the wireless device 16 may provide the beam level RSRP values and allow the network equipment to compute mean and variance, or the wireless device 16 may itself provide the mean and variances of beam RSRP distribution. Again, the beams to be considered for the distribution calculation may be those that are within a certain relative threshold from the strongest beam of the cell. Accordingly, in some embodiments, the wireless device 16 shall (optionally) include beam level RSRP value distribution in its measurement report. Beams in some embodiments correspond to synchronization signal, SS, blocks that carry primary and secondary synchronization signals and a physical broadcast channel.

Although the above description focuses on using certain information for target cell selection, that information may be used alternatively or even additionally to other information. In some embodiments, for example, the target cell is selected further using beam configuration information for each of the one or more cells that characterizes an individual or collective configuration of the different transmit beams of the cell. Such beam configuration information may be exchange between network equipment providing different cells, e.g., via either an X2 interface or an S1 interface according to 3GPP terminology.

Figure 5:
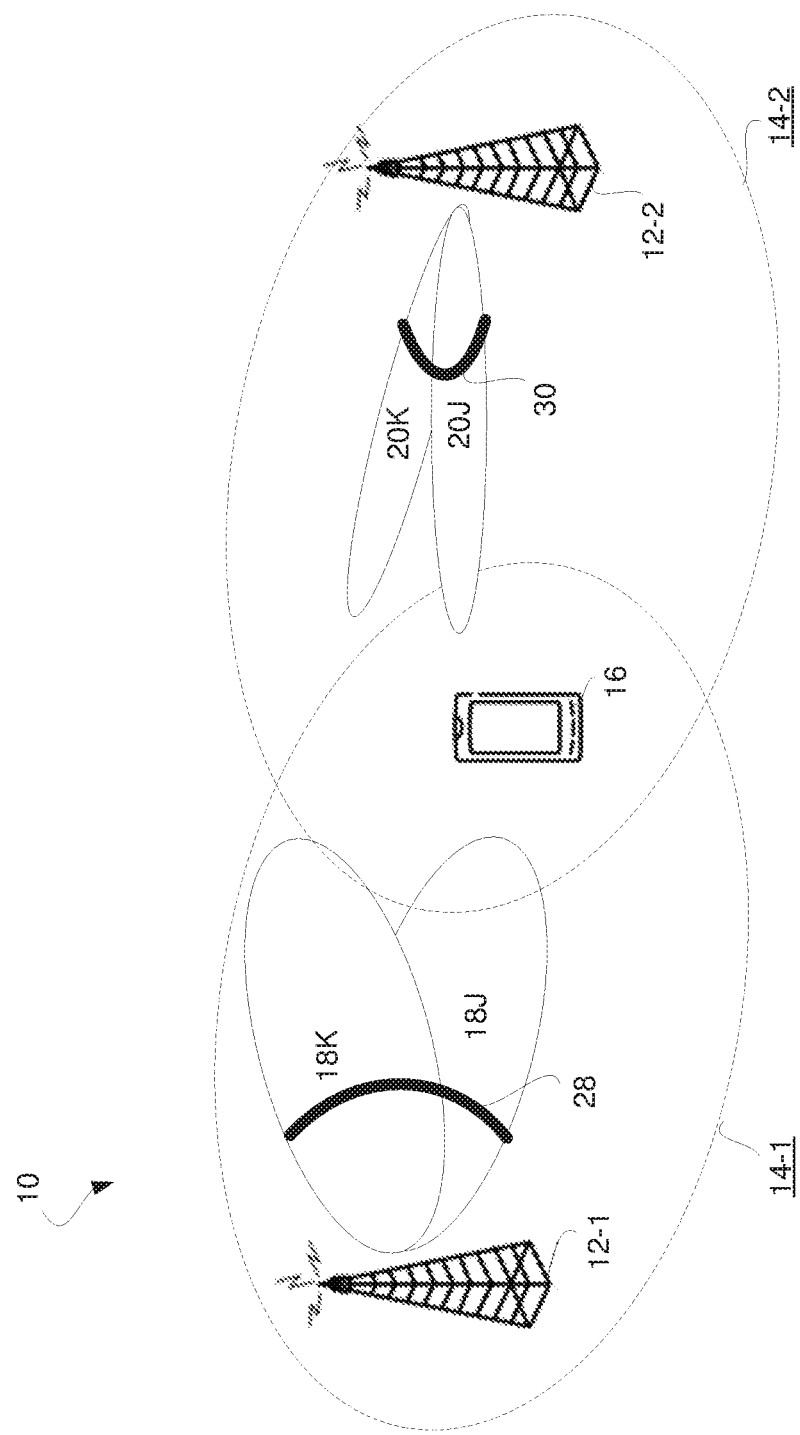
FIG. 5 is a block diagram of a wireless communication system for illustrating a total angular beam coverage according to some embodiments.

In one embodiment, such beam configuration information for a cell indicates a width or angle of a coverage area collectively spanned by the different transmit beams of the cell in one or more spatial dimensions. This collective beam coverage area may be referred to as the total beam width or total angular coverage of a cell. The total angular coverage may be for instance a value between 0-360 degrees in an azimuth dimension and/or a value between 0-180 degrees in an altitude dimension. FIG. 5 illustrates one example where cell 14-1's transmit beams 18J-18K have a total angular coverage 28 that is broader than the total angular coverage 30 of cell 14-2's transmit beams 20J-20K. Regardless, in one embodiment, broader collective coverage of a cell's transmit beams contributes to favoring that cell for selection over a cell whose transmit beams have a narrower collective coverage. In fact, in some embodiments, a cell whose transmit beams have a broader collective coverage may be favored for selection over a cell whose transmit beams have a narrower collective coverage, even if that favored cell has a lower metric $\Omega_i$ derived from the measure of dispersion and the measure of central tendency of the cell's beam received signal measurements. No matter how the beam configuration information is balanced or considered along with the information derived from the measure of dispersion, selecting the cell with broader collective beam coverage may also make target cell selection more robust over time, e.g., since broader beam coverage reduces the likelihood that coverage will be lost and in turn reduces the likelihood that another cell change will be needed. This may in turn reduce signaling overhead associated with cell changes as well as the risk of cell change drops.

As a variation of these embodiments, the width or angle of a coverage area collectively spanned by the different transmit beams of a cell may be restricted or limited to a coverage area in which certain performance requirements are met. The performance requirements may for instance dictate that signal strength or quality must be above a defined threshold at a certain distance from the network equipment or transmission point.

Alternatively or additionally, the beam configuration information for a cell may indicate a number of the different transmit beams of the cell, or a number of the different transmit beams of the cell whose values of the received signal measurements exceeds a threshold. In one embodiment, a cell with a greater number of transmit beams, or a greater number of transmit beams with signal measurement values above the threshold, contributes to favoring that cell for selection over a cell with a fewer number of transmit beams, or a fewer number of transmit beams with signal measurement values above the threshold. Indeed, the greater this number of transmit beams, the greater the number of transmit beams that may be available for fallback in case conditions change and thereby the better the chances of avoiding another cell change.

In still other embodiments, the beam configuration information indicates one or more frequencies at which different transmit beams of a cell are deployed and/or a number of antenna elements used to provide the cell's transmit beams. Indeed, in some embodiments, using a lower carrier frequency in the wireless communication system 10 results in less distance dependent propagation loss, and lower penetration (outdoor-to-indoor propagation) loss compared with when operating on a higher carrier frequency. Some embodiments account for this when candidate cells have similar measures of dispersion but operate at different frequencies, such that lower operating frequency of a cell contributes to favoring that cell over a different cell with a higher operating frequency. For example, if the wireless device 16 goes from outdoor to indoor when selecting the cell on the lower frequency, the wireless device 16 would suffer less drop in signal quality in comparison with when selecting the cell with the higher carrier frequency. Alternatively or additionally, the number of antenna elements may be used for instance to derive an indication of the beam gain ratio between (i) the data link beam from a cell; and (ii) the beams used for radio resource management measurement related signal transmission. This and other information may be used to account for one cell being deployed at a lower frequency while another cell is deployed at a higher frequency and has a different number of antenna elements per frequency layer.

Note that a cell as used herein may be a physical cell or a virtual cell, e.g., provided by one or more transmission points, TRPs. A physical cell may be for instance identified by a physical-layer cell identity, PCI, e.g., as defined in 3GPP standards. This PCI may be tied to primary and/or secondary synchronization signals, PSS/SSS, and a cell reference signal, CRS, for the cell. A virtual cell by contrast may be created within a physical cell, e.g., along with zero or more other virtual cells. The virtual cell's identity may be tied to a channel state information reference signal, CSI-RS in the cell or any type of reference signal transmitted in the cell.

Further note that although embodiments above were described with respect to cell change, embodiments herein are equally application to network equipment change, network node change, TRP change, or any other sort of change between higher-level entities that are each associated with multiple lower-level transmit beams.

The system 10 in some embodiments is a 5G system, or any system that uses very high frequency ranges for communication (e.g., at or above 10 GHz) and/or uses very high-gain narrow beamforming. For such high frequency spectrum, the atmospheric, penetration and diffraction attenuation properties can be much worse than for lower frequency spectrum. In addition, the receiver antenna aperture, as a metric describing the effective receiver antenna area that collects the electromagnetic energy from an incoming electromagnetic wave, is inversely proportional to the frequency, i.e., the link budget would be worse for the same link distance even in a free space scenario, if omnidirectional receive and transmit antennas are used. This motivates the usage of beamforming to compensate for the loss of link budget in high frequency spectrum. Beamforming may be used at the transmitter, at the receiver, or both. In a large part of the spectrum planned for 5G deployments, the preferred configuration is to use a large antenna array at the Access Node (AN) and a small number of antennas at the user equipment. The large antenna array at the AN enables high-order transmit beamforming in the downlink.

For the above reasons, the system 10 may make heavy use of high-gain, narrow beamforming, which will enable high data rate transmission coverage also to very distant user equipment which would not realistically be covered with normal sector-wide beams, which have lower antenna gain. Nonetheless, a beam as used herein may be any size beam created through beamforming, i.e., a beam may be a narrow beam as described above or even a sector-wide beam.

Note too that although beams were by necessity illustrated in the figures in one dimensional space, beams herein may have coverage areas that are described in one, two, or three dimensional space. Moreover, although a signal has been referred to as being transmitted "on" a beam, a signal may in other senses be said to be transmitted "in" or "over" a beam.

Embodiments herein are generally applicable however to any type of wireless communication system 10 which employs beamforming. Indeed, embodiments may use any of one or more communication protocols known in the art or that may be developed, such as IEEE 802.xx, CDMA, WCDMA, GSM, LTE, UTRAN, WiMax, or the like. Accordingly, although sometimes described herein in the context of 5G, the principles and concepts discussed herein are applicable to 4G systems and others.

A wireless device is any type device capable of communicating with a radio network node or another wireless device wirelessly over radio signals. A wireless device may therefore refer to a user equipment, a mobile station, a laptop, a smartphone, a machine-to-machine (M2M) device, a machine-type communications (MTC) device, a narrowband Internet of Things (IoT) device, etc. A user equipment in this regard does not necessarily have a "user" in the sense of an individual person owning and/or operating the device. A wireless device may also be referred to as a wireless communication device, a radio device, a radio communication device, a wireless terminal, or simply a terminal—unless the context indicates otherwise, the use of any of these terms is intended to include device-to-device UEs or devices, machine-type devices or devices capable of machine-to-machine communication, sensors equipped with a wireless device, wireless-enabled table computers, mobile terminals, smart phones, laptop-embedded equipped (LEE), laptop-mounted equipment (LME), USB dongles, wireless customer-premises equipment (CPE), etc. In the discussion herein, the terms machine-to-machine (M2M) device, machine-type communication (MTC) device, wireless sensor, and sensor may also be used. It should be understood that these devices may be UEs, but may be generally configured to transmit and/or receive data without direct human interaction.

In an IOT scenario, a wireless device as described herein may be, or may be comprised in, a machine or device that performs monitoring or measurements, and transmits the results of such monitoring measurements to another device or a network. Particular examples of such machines are power meters, industrial machinery, or home or personal appliances, e.g. refrigerators, televisions, personal wearables such as watches etc. In other scenarios, a wireless device as described herein may be comprised in a vehicle and may perform monitoring and/or reporting of the vehicle's operational status or other functions associated with the vehicle.

As used herein, network equipment comprises any equipment capable, configured, arranged and/or operable to communicate directly or indirectly with a wireless device and/or with other equipment in the wireless communication system that enable and/or provide wireless access to the network equipment. Examples of network equipment include, but are not limited to, base stations (BSs), radio base stations, Node Bs, multi-standard radio (MSR) radio nodes such as MSR BSs, evolved Node Bs (eNBs), femto base stations, pico base stations, micro base stations, macro base stations, one or more (or all) parts of a distributed radio base station such as centralized digital units and/or remote radio units (which may or may not be integrated with an antenna as an antenna integrated radio), network controllers, radio network controllers (RNCs), base station controllers (BSCs), relay nodes, relay donor node controlling relays, base transceiver stations (BTSs), access points (APs), radio access points, transmission points, transmission nodes, Remote Radio Units (RRUs), Remote Radio Heads (RRHs), nodes in a distributed antenna system (DAS), Multi-cell/multicast Coordination Entities (MCEs), core network nodes (e.g., MSCs, MMEs), O&M nodes, OSS nodes, SON nodes, positioning nodes (e.g., E-SMLCs), and/or MDTs. More generally, however, network equipment may represent any suitable device (or group of devices) capable, configured, arranged, and/or operable to enable and/or provide a wireless device access to the wireless communication network or to provide some service to a wireless device that has accessed the wireless communication network. The list above is not intended to express just alternative radio network nodes, but to express various examples of classes of network equipment as well as examples of specific network equipment.

Note that a wireless device 16 as described above may perform the method in FIG. 2 and any other processing herein by implementing any functional means or units. In one embodiment, for example, the wireless device 16 comprises respective circuits or circuitry configured to perform the steps shown in FIG. 2. The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 6A:
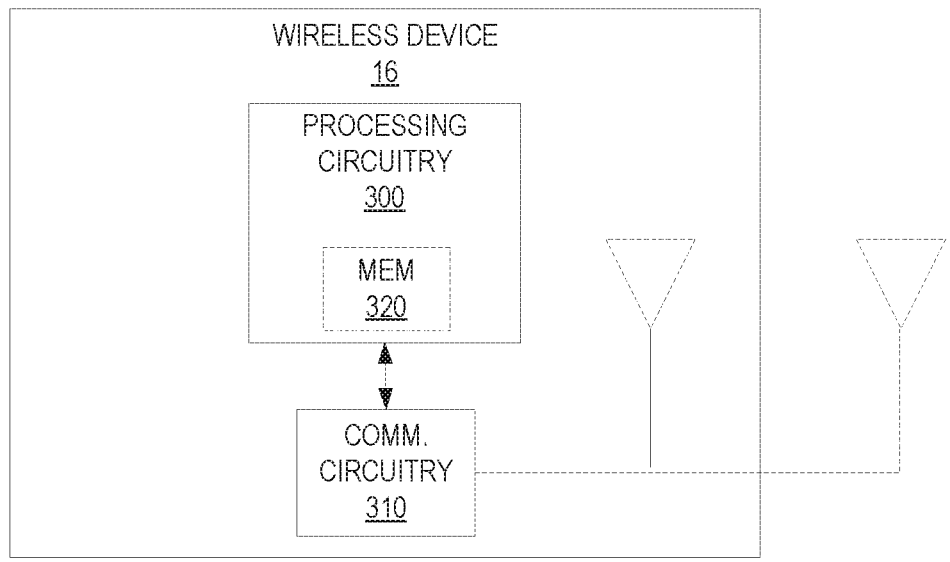
FIG. 6A is a block diagram of a wireless device according to some embodiments.

FIG. 6A for example illustrates the wireless device 16 in accordance with one or more embodiments. As shown, the wireless device 16 includes processing circuitry 300 and communication circuitry 310. The communication circuitry 310 (e.g., in the form of a transmitter, receiver, transceiver, or radio frequency circuitry) is configured to transmit and/or receive information to and/or from one or more other nodes, e.g., via any communication technology. Such communication may occur via one or more antennas that are either internal or external to the wireless device 16 as shown. The processing circuitry 300 is configured to perform processing described above, such as by executing instructions stored in memory 320, whereby the wireless device 16 is configured to perform the method in FIG. 2. The processing circuitry 300 in this regard may implement certain functional means, units, or modules.

In some embodiments, the wireless device is configured to obtain, for each of one or more cells, information derived from a measure of dispersion of the values of received signal measurements respectively performed by the wireless device 16 on different transmit beams of the cell and to use the obtained information to select, or to assist network equipment 500A, 500B to select, from the one or more cells a target cell to which the wireless device 16 is to change: and perform a cell change to the selected target cell.

In some embodiments, the wireless device may be configured to using the obtained information by reporting the obtained information to the network equipment, and wherein the step of performing is responsive to receiving a command from the network equipment to perform the cell change to the selected target cell.

In some embodiments, a relatively smaller dispersion of the values of the received signal measurements for a cell contributes to favoring that cell for selection over a cell with a relatively larger dispersion of the values of the received signal measurements. In some embodiments, the measure of dispersion may be variance or standard deviation. In some embodiments, the obtained information may be the measure of dispersion. In some embodiments, the obtained information for a cell may be a metric that is derived from both (i) the measure of dispersion of the values of received signal measurements respectively performed by the wireless device (16) on different transmit beams of the cell; and (ii) a measure of central tendency of the values of received signal measurements respectively performed by the wireless device (16) on different transmit beams of the cell, wherein the metric increases with increasing measure of central tendency and decreases with increasing measure of dispersion. In some embodiments, the metric may be equal either the measure of central tendency minus the measure of dispersion or the measure of dispersion divided by the measure of central tendency. In some embodiments, the target cell may be selected as the cell with the maximum metric. In some embodiments, the metric may be a weighted metric that applies a weight to the measure of dispersion that is different than a weight applied to the measure of central tendency. In some embodiments, the obtained information may be used to select, from among any of the one or more cells whose measure of central tendency of the received signal measurements is above a threshold, the target cell as the cell with the smallest measure of dispersion of the values of the received signal measurements. In some embodiments, the target cell may be selected further using beam configuration information for each of the one or more cells that characterizes an individual or collective configuration of the different transmit beams of the cell. In some embodiments, the beam configuration information for a cell may indicate a width or angle of a coverage area collectively spanned by the different transmit beams of the cell in one or more spatial dimensions. In some embodiments, the beam configuration information for a cell may indicate a number of the different transmit beams of the cell or a number of the different transmit beams of the cell whose values of the received signal measurements exceeds a threshold.

Figure 6B:
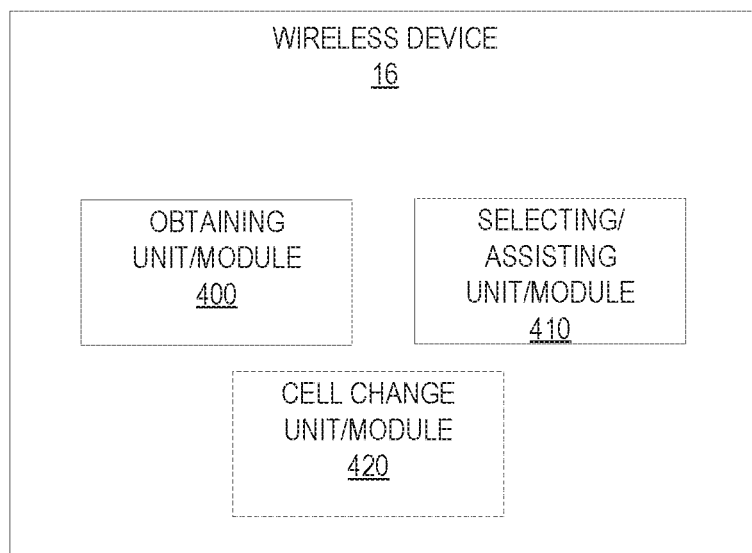
FIG. 6B is a block diagram of a wireless device according to other embodiments.

FIG. 6B illustrates the wireless device 16 in accordance with one or more other embodiments. As shown, wireless device 16 implements various functional means, units, or modules, e.g., via the processing circuitry 300 in FIG. 6A and/or via software code, for implementing the functionality described above (e.g., for implementing the steps in FIG. 2).

These functional means, units, or modules include for instance an obtaining module 400 for obtaining, for each of one or more cells, information derived from a measure of dispersion of the values of received signal measurements respectively performed by the wireless device on different transmit beams of the cell. Also included is a selecting module or an assisting module 410 for using the obtained information to select, or to assist network equipment to select, from the one or more cells a target cell to which the wireless device 16 is to change. Further included is a cell change unit or module 420 for performing a cell change to the selected target cell.

In some embodiments, the selecting module/assisting module may be configured to using the obtained information by reporting the obtained information to the network equipment, and wherein the step of performing a cell change is responsive to receiving a command from the network equipment to perform the cell change to the selected target cell. In some embodiments, a relatively smaller dispersion of the values of the received signal measurements for a cell contributes to favoring that cell for selection over a cell with a relatively larger dispersion of the values of the received signal measurements. In some embodiments, the measure of dispersion may be variance or standard deviation. In some embodiments, the obtained information may be the measure of dispersion. In some embodiments, the obtained information for a cell may be a metric that is derived from both (i) the measure of dispersion of the values of received signal measurements respectively performed by the wireless device (16) on different transmit beams of the cell; and (ii) a measure of central tendency of the values of received signal measurements respectively performed by the wireless device (16) on different transmit beams of the cell, wherein the metric increases with increasing measure of central tendency and decreases with increasing measure of dispersion. In some embodiments, the metric may be equal either the measure of central tendency minus the measure of dispersion or the measure of dispersion divided by the measure of central tendency. In some embodiments, the target cell may be selected as the cell with the maximum metric. In some embodiments, the metric may be a weighted metric that applies a weight to the measure of dispersion that is different than a weight applied to the measure of central tendency. In some embodiments, the obtained information may be used to select, from among any of the one or more cells whose measure of central tendency of the received signal measurements is above a threshold, the target cell as the cell with the smallest measure of dispersion of the values of the received signal measurements. In some embodiments, the target cell may be selected further using beam configuration information for each of the one or more cells that characterizes an individual or collective configuration of the different transmit beams of the cell. In some embodiments, the beam configuration information for a cell may indicate a width or angle of a coverage area collectively spanned by the different transmit beams of the cell in one or more spatial dimensions. In some embodiments, the beam configuration information for a cell may indicate a number of the different transmit beams of the cell or a number of the different transmit beams of the cell whose values of the received signal measurements exceeds a threshold.

Also note that network equipment as described above may perform the processing in FIG. 3 and/or any processing herein, by implementing any functional means or units. The network equipment may be for instance a base station or transmission point controlling one or more of the candidate cells considered for the cell change, e.g., base station 12-1 or 12-2. In one embodiment, the network equipment comprises respective circuits or circuitry configured to perform the steps of processing described herein (e.g., signaling). The circuits or circuitry in this regard may comprise circuits dedicated to performing certain functional processing and/or one or more microprocessors in conjunction with memory. In embodiments that employ memory, which may comprise one or several types of memory such as read-only memory (ROM), random-access memory, cache memory, flash memory devices, optical storage devices, etc., the memory stores program code that, when executed by the one or more processors, carries out the techniques described herein.

Figure 7A:
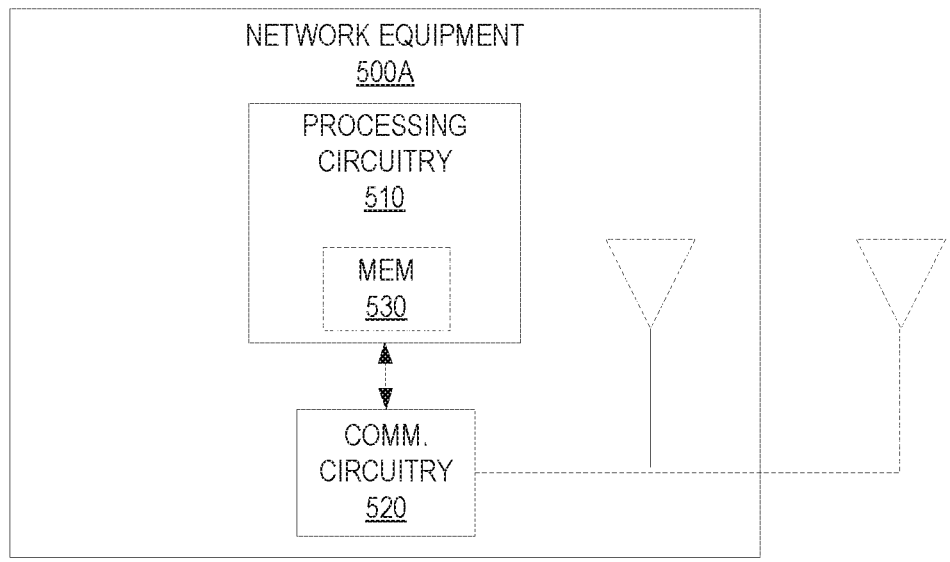
FIG. 7A is a block diagram of network equipment according to some embodiments.

FIG. 7A for example illustrates the network equipment 500A in accordance with one or more embodiments. As shown, the network equipment 500A includes processing circuitry 510 and communication circuitry 520. The communication circuitry 520 (e.g., in the form of a transmitter, receiver, transceiver, or radio frequency circuitry) is configured to transmit and/or receive information to and/or from one or more other nodes, e.g., via any communication technology. Such communication may occur via one or more antennas that are either internal or external to the network equipment 500A as shown. The processing circuitry 510 is configured to perform processing described above, such as by executing instructions stored in memory 530, wherein the network equipment 500A is configured to perform the method in FIG. 3. The processing circuitry 510 in this regard may implement certain functional means, units, or modules.

In one embodiment, the network equipment is configured to obtain, for each of one or more cells, information derived from a measure of dispersion of the values of received signal measurements respectively performed by the wireless device 16 on different transmit beams of the cell and to use the obtained information to select from the one or more cells a target cell to which the wireless device 16 is to change and command the wireless device 16 to perform a cell change to the selected target cell.

In some embodiments, a relatively smaller dispersion of the values of the received signal measurements for a cell contributes to favoring that cell for selection over a cell with a relatively larger dispersion of the values of the received signal measurements. In some embodiments, the measure of dispersion may be variance or standard deviation. In some embodiments, the obtained information may be the measure of dispersion. In some embodiments, the obtained information for a cell may be a metric that is derived from both (i) the measure of dispersion of the values of received signal measurements respectively performed by the wireless device (16) on different transmit beams of the cell; and (ii) a measure of central tendency of the values of received signal measurements respectively performed by the wireless device (16) on different transmit beams of the cell, wherein the metric increases with increasing measure of central tendency and decreases with increasing measure of dispersion. In some embodiments, the metric may be equal either the measure of central tendency minus the measure of dispersion or the measure of dispersion divided by the measure of central tendency. In some embodiments, the target cell may be selected as the cell with the maximum metric. In some embodiments, the metric may be a weighted metric that applies a weight to the measure of dispersion that is different than a weight applied to the measure of central tendency. In some embodiments, the obtained information may be used to select, from among any of the one or more cells whose measure of central tendency of the received signal measurements is above a threshold, the target cell as the cell with the smallest measure of dispersion of the values of the received signal measurements. In some embodiments, the target cell may be selected further using beam configuration information for each of the one or more cells that characterizes an individual or collective configuration of the different transmit beams of the cell. In some embodiments, the beam configuration information for a cell may indicate a width or angle of a coverage area collectively spanned by the different transmit beams of the cell in one or more spatial dimensions. In some embodiments, the beam configuration information for a cell may indicate a number of the different transmit beams of the cell or a number of the different transmit beams of the cell whose values of the received signal measurements exceeds a threshold.

Figure 7B:
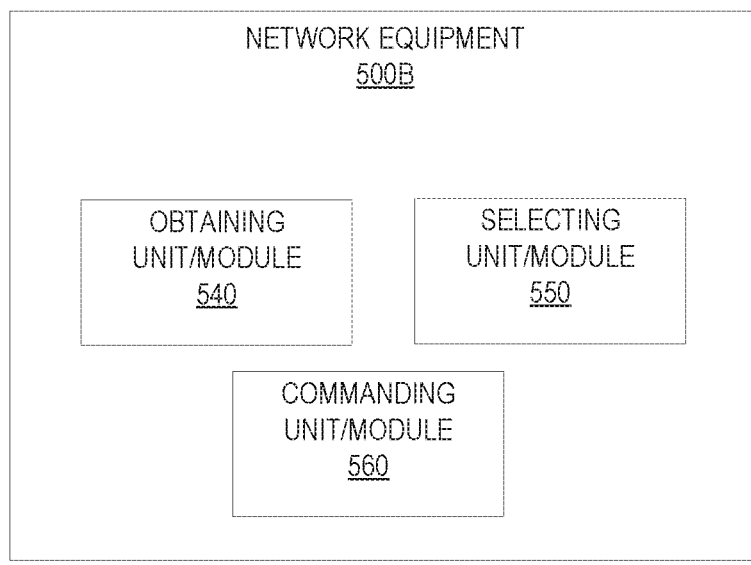
FIG. 7B is a block diagram of network equipment according to other embodiments.

FIG. 7B illustrates network equipment 500B in accordance with one or more other embodiments. As shown, network equipment 500B implements various functional means, units, or modules, e.g., via the processing circuitry 510 in FIG. 7A and/or via software code, for implementing the functionality described above (e.g., for implementing the steps in FIG. 3). These functional means, units, or modules include for instance an obtaining module 540 for obtaining, for each of one or more cells, information derived from a measure of dispersion of the values of received signal measurements respectively performed by the wireless device 16 on different transmit beams of the cell. Also included is a selecting module 550 for using the obtained information to select from the one or more cells a target cell to which the wireless device 16 is to change. Further included is a commanding unit or module 560 for commanding the wireless device 16 to perform a cell change to the selected target cell.

In some embodiments, a relatively smaller dispersion of the values of the received signal measurements for a cell contributes to favoring that cell for selection over a cell with a relatively larger dispersion of the values of the received signal measurements. In some embodiments, the measure of dispersion may be variance or standard deviation. In some embodiments, the obtained information may be the measure of dispersion. In some embodiments, the obtained information for a cell may be a metric that is derived from both (i) the measure of dispersion of the values of received signal measurements respectively performed by the wireless device (16) on different transmit beams of the cell; and (ii) a measure of central tendency of the values of received signal measurements respectively performed by the wireless device (16) on different transmit beams of the cell, wherein the metric increases with increasing measure of central tendency and decreases with increasing measure of dispersion. In some embodiments, the metric may be equal either the measure of central tendency minus the measure of dispersion or the measure of dispersion divided by the measure of central tendency. In some embodiments, the target cell may be selected as the cell with the maximum metric. In some embodiments, the metric may be a weighted metric that applies a weight to the measure of dispersion that is different than a weight applied to the measure of central tendency. In some embodiments, the obtained information may be used to select, from among any of the one or more cells whose measure of central tendency of the received signal measurements is above a threshold, the target cell as the cell with the smallest measure of dispersion of the values of the received signal measurements. In some embodiments, the target cell may be selected further using beam configuration information for each of the one or more cells that characterizes an individual or collective configuration of the different transmit beams of the cell. In some embodiments, the beam configuration information for a cell may indicate a width or angle of a coverage area collectively spanned by the different transmit beams of the cell in one or more spatial dimensions. In some embodiments, the beam configuration information for a cell may indicate a number of the different transmit beams of the cell or a number of the different transmit beams of the cell whose values of the received signal measurements exceeds a threshold.

Those skilled in the art will also appreciate that embodiments herein further include corresponding computer programs.

A computer program comprises instructions which, when executed on at least one processor of a wireless device 16, cause the wireless device 16 to carry out any of the respective processing described above. A computer program in this regard may comprise one or more code modules corresponding to the means or units described above.

In other embodiments, 1 computer program comprises instructions which, when executed on at least one processor of network equipment, cause the network equipment to carry out any of the respective processing described above. A computer program in this regard may comprise one or more code modules corresponding to the means or units described above.

Embodiments further include a carrier containing any of these computer programs. This carrier may comprise one of an electronic signal, optical signal, radio signal, or computer readable storage medium.

In this regard, embodiments herein also include a computer program product stored on a non-transitory computer readable (storage or recording) medium and comprising instructions that, when executed by a processor of the wireless device 16 or network equipment, cause the wireless device 16 or network equipment to perform as described above.

Embodiments further include a computer program product comprising program code portions for performing the steps of any of the embodiments herein when the computer program product is executed by a computing device. This computer program product may be stored on a computer readable recording medium.

The present invention may, of course, be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A wireless device configured for use in a wireless communication system, the wireless device comprising:
processing circuitry and a memory, the memory containing instructions executable by the processing circuitry whereby the wireless device is configured to:
for each of one more cells, perform received signal measurements on different transmit beams of the cell, the received signal measurements including (i) a measure of dispersion of the values of received signal measurements performed by the wireless device on different transmit beams of the cell, and (ii) a measure of central tendency of the values of received signal measurements respectively;
compute, for each of the one or more cells, a weighted metric based on the both the measure of dispersion and the measure of central tendency for the cell, wherein:

the weighted metric increases with increasing measure of central tendency and decreases with increasing measure of dispersion; and
the weighted metric applies a weight to the measure of dispersion that is different than a weight applied to the measure of central tendency;
select, or assist network equipment to select, from the one or more cells a target cell to which the wireless device is to change based on; the weighted metric; and
perform a cell change to the selected target cell.

2. The wireless device of claim 1, the memory containing instructions executable by the processing circuitry whereby the wireless device is configured to:
assist selection of the target cell by reporting the obtained information to the network equipment; and
perform the cell change responsive to receiving a command from the network equipment to perform the cell change to the selected target cell.

3. The wireless device of claim 1, wherein a smaller dispersion of the values of the received signal measurements for a cell contributes to favoring that cell for selection over a cell with a larger dispersion of the values of the received signal measurements.

4. The wireless device of claim 1, wherein the measure of dispersion is variance or standard deviation.

5. The wireless device of claim 1, wherein the metric equals either:
the measure of central tendency minus the measure of dispersion; or
the measure of dispersion divided by the measure of central tendency.

6. The wireless device of claim 1, wherein the target cell is selected as the cell with the maximum metric.

7. The wireless device of claim 1, wherein the o the target cell is selected, from among any of the one or more cells whose measure of central tendency of the received signal measurements is above a threshold, as the cell with the smallest measure of dispersion of the values of the received signal measurements.

8. The wireless device of claim 1, wherein the target cell is selected further using beam configuration information for each of the one or more cells that characterizes an individual or collective configuration of the different transmit beams of the cell.

9. The wireless device of claim 8, wherein the beam configuration information for a cell indicates a width or angle of a coverage area collectively spanned by the different transmit beams of the cell in one or more spatial dimensions.

10. The wireless device of claim 8, wherein the beam configuration information for a cell indicates a number of the different transmit beams of the cell or a number of the different transmit beams of the cell whose values of the received signal measurements exceeds a threshold.

11. Network equipment configured for use in a wireless communication system, the network equipment comprising:
processing circuitry and a memory, the memory containing instructions executable by the processing circuitry whereby the network equipment is configured to:
obtain, for each of one or more cells, information derived from received signal measurements performed by the wireless device on different transmit beams of the cell, wherein the received signal measurements comprise both (i) a measure of dispersion of the values of received signal measurements performed by the wireless device on different transmit beams of the cell, and (ii) a measure of a central tendency of the values of received signal measurements respectively; or
compute, for each of the one or more cells, a weighted metric based on the both the measure of dispersion and the measure of central tendency for the cell, wherein:
the weighted metric increases with increasing measure of central tendency and decreases with increasing measure of dispersion; and
the weighted metric applies a weight to the measure of dispersion that is different than a weight applied to the measure of central tendency;
select, based on the weighted metric, from the one or more cells a target cell to which the wireless device is to change; and
command the wireless device to perform a cell change to the selected target cell.

12. The network equipment of claim 11, wherein a relatively smaller dispersion of the values of the received signal measurements for a cell contributes to favoring that cell for selection over a cell with a relatively larger dispersion of the values of the received signal measurements.

13. The network equipment of claim 11, wherein the measure of dispersion is variance or standard deviation.

14. The network equipment of claim 11, wherein the metric equals either:
the measure of central tendency minus the measure of dispersion; or
the measure of dispersion divided by the measure of central tendency.

15. The network equipment of claim 11, wherein the target cell is selected as the cell with the maximum metric.

16. The network equipment of claim 11, wherein the obtained information is used to select, from among any of the one or more cells whose measure of central tendency of the received signal measurements is above a threshold, the target cell as the cell with the smallest measure of dispersion of the values of the received signal measurements.

17. The network equipment of claim 11, wherein the target cell is selected further using beam configuration information for each of the one or more cells that characterizes an individual or collective configuration of the different transmit beams of the cell.

18. The network equipment of claim 17, wherein the beam configuration information for a cell indicates a width or angle of a coverage area collectively spanned by the different transmit beams of the cell in one or more spatial dimensions.

19. The network equipment of claim 17, wherein the beam configuration information for a cell indicates a number of the different transmit beams of the cell or a number of the different transmit beams of the cell whose values of the received signal measurements exceeds a threshold.

20. A method performed by a wireless device configured for use in a wireless communication system, the method comprising:
for each of one more cells, performing received signal measurements on different transmit beams of the cell, the received signal measurements including a measure of dispersion of the values of received signal measurements performed by the wireless device on different transmit beams of the cell; and (ii) a measure of central tendency of the values of received signal measurements respectively;

computing, for each of the one or more cells, a weighted metric based on the both the measure of dispersion and the measure of central tendency for the cell, wherein:
    the weighted metric increases with increasing measure of central tendency and decreases with increasing measure of dispersion; and
    the weighted metric applies a weight to the measure of dispersion that is different than a weight applied to the measure of central tendency;
selecting, or assisting network equipment to select, from the one or more cells a target cell to which the wireless device is to change based on the weighted metric; and
performing a cell change to the selected target cell.

21. A method performed by network equipment configured for use in a wireless communication system, the method comprising:
obtaining, for each of one or more cells, information derived from received signal measurements performed by the wireless device on different transmit beams of the cell, wherein the received signal measurements comprise both (i) a measure of dispersion of the values of received signal measurements performed by the wireless device on different transmit beams of the cell, and (ii) a measure of a central tendency of the values of received signal measurements respectively;
computing, for each of the one or more cells, a weighted metric based on the both the measure of dispersion and the measure of central tendency for the cell, wherein:
    the weighted metric increases with increasing measure of central tendency and decreases with increasing measure of dispersion; and
    the weighted metric applies a weight to the measure of dispersion that is different than a weight applied to the measure of central tendency;
selecting, based on the weighted metric, from the one or more cells a target cell to which the wireless device is to change; and
commanding the wireless device to perform a cell change to the selected target cell.

* * * * *